(12) United States Patent
Braubach et al.

(10) Patent No.: US 7,209,072 B2
(45) Date of Patent: Apr. 24, 2007

(54) METHOD FOR DRIFT COMPENSATION WITH RADAR MEASUREMENTS WITH THE AID OF REFERENCE RADAR SIGNALS

(75) Inventors: Harald Braubach, Bermatingen (DE); Michael Voelker, Immenstaad (DE)

(73) Assignee: EADS Astrium GmbH, Munich (DE)

( * ) Notice: Subject to any disclaimer, the term of this patent is extended or adjusted under 35 U.S.C. 154(b) by 148 days.

(21) Appl. No.: 10/963,521

(22) Filed: Oct. 14, 2004

(65) Prior Publication Data
US 2005/0083225 A1 Apr. 21, 2005

(30) Foreign Application Priority Data
Oct. 15, 2003 (DE) .................. 103 48 621

(51) Int. Cl.
*G01S 7/40* (2006.01)
*G01S 13/00* (2006.01)

(52) U.S. Cl. .................. 342/59; 342/174; 342/82; 342/89

(58) Field of Classification Search .................. 342/59, 342/73, 82–103, 174
See application file for complete search history.

(56) References Cited

U.S. PATENT DOCUMENTS

| | | | |
|---|---|---|---|
| 5,252,980 A | 10/1993 | Gray et al. | 342/59 |
| 5,434,570 A | 7/1995 | Wurman | 342/26 D |
| 5,469,169 A | 11/1995 | Frush et al. | 342/26 D |
| 6,037,898 A * | 3/2000 | Parish et al. | 342/174 |
| 6,320,540 B1 * | 11/2001 | Meredith | 342/377 |
| 6,552,678 B1 | 4/2003 | Adragna | 342/25 R |
| 7,091,906 B2 * | 8/2006 | Chevalier et al. | 342/368 |
| 7,109,916 B2 * | 9/2006 | Klinnert et al. | 342/134 |
| 7,119,739 B1 * | 10/2006 | Struckman | 342/174 |
| 2002/0014985 A1 * | 2/2002 | Wurman et al. | 342/26 |
| 2005/0083225 A1 * | 4/2005 | Braubach et al. | 342/25 C |

FOREIGN PATENT DOCUMENTS

| | | |
|---|---|---|
| EP | 1065518 | 1/2001 |
| EP | 1426785 | 6/2004 |
| JP | 60119484 | 6/1985 |

OTHER PUBLICATIONS

"Oscillator Clock Drift Compensation in Bistatic Interferometric SAR," by M. Eineder, IGARSS 2003, IEEE, Proceedings of IGARSS, 2003.
Patent Abstracts of Japan, vol. 009, No. 273 (p. 401) and Japanese Patent No. JP 60 119484 A that published Jun. 26, 1985.

* cited by examiner

*Primary Examiner*—John B. Sotomayor
(74) *Attorney, Agent, or Firm*—Greenblum & Bernstein P.L.C.

(57) ABSTRACT

A method of radar measurement by transmitting and receiving radar signals with at least two spatially separated radar systems. The method further includes exchanging reference radar signals between the at least two radar systems to determine measurement-relevant parameters. Moreover, a determination of at least one of a relative phase relationship of the reference radar signals of the radar systems and a relative time position of time references of the radar systems is based on reference radar signals received. The instant abstract is neither intended to define the invention disclosed in this specification nor intended to limit the scope of the invention in any way.

20 Claims, 1 Drawing Sheet

METHOD FOR DRIFT COMPENSATION WITH RADAR MEASUREMENTS WITH THE AID OF REFERENCE RADAR SIGNALS

CROSS-REFERENCE TO RELATED APPLICATIONS

The present application claims priority under 35 U.S.C. §119 of German Patent Application No. 103 48 621.6, filed on Oct. 15, 2003, the disclosure of which is expressly incorporated by reference herein in its entirety.

BACKGROUND OF THE INVENTION

1. Field of the Invention

The present invention relates to a method for radar measurement, in particular for interferometric radar measurement by transmitting and receiving radar signals with at least two spatially separated radar systems, where a signal exchange between the two radar systems takes place to determine parameters relevant to the measurement.

2. Discussion of Background Information

Such a method is known, e.g., from EP 1 065 518. This describes a high-resolution synthetic aperture radar system (SAR system) which includes a number n of SAR systems on carrier platforms carried by satellites or aircraft. It is provided in particular here that the internal oscillators of the SAR systems that are used as a time reference, are synchronized among themselves in that the oscillator frequency of a main oscillator is transmitted via a microwave connection or a laser connection to the other oscillators.

Eineder, M.: *Oscillator Clock Drift Compensation in Bistatic Interferometric SAR*. IGARSS 2003, Toulouse, IEEE, Proceedings of IGARSS'03, (2003) describes the compensation of the drift of time references with SAR systems in which the transmitter of the radar signals is arranged spatially separate from the receivers of the radar signals on different satellites (cartwheel arrangement). Here too the frequency of the internal oscillators is exchanged via an inter-satellite connection between the receiver satellites in order to achieve a synchronization of the internal time references.

However, these methods according to the prior art require separate inter-satellite connections via which a transmission of the oscillator frequency must take place. Further measurement-relevant parameters cannot be determined with these methods.

In contrast, U.S. Pat. No. 6,552,678 provides a method for interferometric SAR radar measurement with the aid of two satellites which, according to the text of U.S. Pat. No. 6,552,678, manages without any synchronization at all of the radar signals of the two satellites.

SUMMARY OF THE INVENTION

One aspect of the present invention is to provide a simplified possibility for determining measurement-relevant parameters that moreover permits a more extensive determination of measurement-relevant parameters.

This aspect is attained through the features of a method for radar measurement by transmitting and receiving radar signals with at least two spatially separated radar systems. In particular, a signal exchange between the two radar systems takes place to determine measurement-relevant parameters. Moreover, an exchange of reference radar signals takes place between at least two radar systems and a determination of the relative phase relationship of the radar signals of the radar systems and/or the relative time position of time references of the radar systems takes place on the basis of the reference radar signals received.

Furthermore, this aspect comprises a method for radar measurement, in particular for interferometric radar measurement, by transmitting and receiving radar signals with at least two spatially separated radar systems, where an exchange of signals between the two radar systems takes place to determine measurement-relevant parameters. According to the invention it is now provided that an exchange of reference radar signals takes place between at least two radar systems and a determination of the relative phase relationship of the radar signals of the radar systems and/or the relative time position of time references of the radar systems takes place on the basis of the reference radar signals received.

Within the scope of the invention, radar measurement means that radar signals are transmitted in the direction of a radar target to be measured, and from the signal response radiated back passively, i.e., essentially by reflection, from the radar target, information is obtained about the composition of the radar target, e.g., about size, surface structure, material composition or the like. In contrast, the reference radar signals are transmitted from one radar system to another without a signal response radiated back passively through reflections being evaluated. Within the scope of the invention the exchange of reference radar signals can take place directly and/or via a diversion, e.g., passively via a radar target to be measured or actively via other radar systems arranged in a spatially separated manner.

Compared with the prior art, this method has the decisive advantage that no separate signal source and additional types of transmission systems, such as, e.g., optical systems have to be provided for signal exchange between the radar systems, and that for signal exchange the radar signals can be used which are produced and measured within the scope of the radar measurement. They can either be transmitted to at least one other radar system via the transmitter device used for measurement, or a structurally separate transmitter devices can be provided for the separate transmission of radar signal and reference radar signal, where, however, the two radar signals come from the same signal source. The primary result of this method can thereby be information on the relative phase relationship of the radar signals emitted from at least two radar systems and/or information on the relative time position of time references of the radar systems, thus, e.g., on an offset of the internal system times of the radar systems.

It can now be provided in particular that information is ascertained on the internal time references of the radar systems on the basis of the knowledge of the relative phase relationship of the radar signals. The radar signals are produced in the radar systems based on signals of internal time references such as in particular internal oscillators or of received and internally processed time data. The radar signals of a radar system thus carry structures that permit inferences about the internal time references of the respective radar system. The present method thus permits the acquisition of more extensive measurement-relevant information.

It can be provided in particular that a determination of the time-dependence of the relative phase relationship takes place, the drift of at least one internal time reference is determined therefrom and a drift compensation is carried out on the basis of the knowledge of the drift of this time reference. With this method, the time development of measurement-relevant parameters can therefore be followed and in particular a compensation of undesired deviations of the parameters (drift) during the time development can be compensated.

It can thereby be provided that the drift of a time reference is determined in real time and a drift compensation is made by readjusting the corresponding time reference. With this alternative of the method at least one time reference is thus always readjusted such that, if possible, no undesired deviation occurs with respect to at least one further time reference of another radar system. Such a method ultimately leads to a synchronization of the internal time references of the radar systems, but in a much simpler manner than hitherto provided in the prior art.

However, alternatively, it can also be provided that the drift of a time reference is determined within the scope of an evaluation of measured radar data and that a drift compensation takes place through the correction of phase and time data of the measured radar data. With such a method, no synchronization of the internal time references of different radar systems thus takes place, instead the drift of the internal time reference is only registered and taken into consideration in the scope of a later evaluation of the radar measurements through corresponding corrections of the phase and time data. The degree of processing and regulating within the radar systems can thus be greatly reduced.

Alternatively to determining information through the internal time references via the knowledge of the relative phase relationship of radar signals, a determination of the relative time position of the time references can take place directly on the basis of a comparison of received reference radar signals with a reference function within one of the radar systems. The relative time position between the reference radar signal and reference function is determined from the result of the comparison. The relative time position of the time references can then be determined from this, then taking into consideration the signal duration of the reference radar signal. In this further development of the invention (as with other further developments of the invention as well, if necessary there) the signal transit time of the reference radar signal between the transmitting radar system and the receiving radar system can be determined either from the knowledge of the distance between the radar systems that can be based on distance measurements or also on the knowledge of the positions of the radar systems from path models, internal position-locating installations, such as, e.g., GPS or from position data received externally. However, the transit time can also be determined through separate transit time measurements that again preferably take place through an exchange of radar signals between the radar systems.

One aspect of the invention includes a method of radar measurement by transmitting and receiving radar signals with at least two spatially separated radar systems. The method further includes exchanging reference radar signals between the at least two radar systems to determine measurement-relevant parameters. Moreover, a determination of at least one of a relative phase relationship of the reference radar signals of the radar systems and a relative time position of time references of the radar systems is based on reference radar signals received.

In a further aspect of the invention, the method can include ascertaining information on internal time references of the at least two radar systems based on the relative phase relationship of the reference radar signals. Moreover, the method can include determining a time-dependence of the relative phase relationship, determining a drift of at least one internal time reference, and compensating the drift on a basis of the drift of the time reference. Furthermore, the drift of the at least one internal time reference can be determined in real time and the drift compensation can be made by readjusting a corresponding time reference. Additionally, the drift of a time reference can be determined within a scope of an evaluation of measured radar data and that the drift compensation takes place through a correction of time data of the measured radar data. Furthermore, the determination of the relative time position of the time references can include comparing received reference radar signals to a reference function within one of the radar systems, whereby the relative time position between the reference radar signals and the reference function is determined from a result and the relative time position of the time references is determined therefrom, taking into consideration a signal transit time of the reference radar signal. Moreover, the reference radar signals can include radar signals produced by the radar systems within a scope of a radar measurement. Additionally, the reference radar signals can be transmitted with a transmitter device of the radar systems used for radar measurement to at least one other radar system. Moreover, the reference radar signals can be transmitted with a separate transmitter device that is structurally separate from a transmitter device used for radar measurement, where the reference radar signals and radar signals used for radar measurement are produced by a common signal source. Additionally, a radar measurement system can utilize the radar measurement method noted above.

Yet another aspect of the invention includes a method of radar measurement utilizing at least two spatially separated radar systems. The method includes exchanging reference radar signals between the at least two radar systems and determining at least one of a relative phase relationship of the reference radar signals of the radar systems and a relative time position of time references of the radar systems is based on the reference radar signals received.

In a further aspect of the invention, the method can include ascertaining information on internal time references of the at least two radar systems based on the relative phase relationship of the reference radar signals. Moreover, the method can include determining a time-dependence of the relative phase relationship, determining a drift of at least one internal time reference, and compensating the drift on a basis of the drift of the time reference. Furthermore, the drift of the at least one internal time reference can be determined in real time and the drift compensation can be made by readjusting a corresponding time reference. Additionally, the drift of a time reference can be determined within a scope of an evaluation of measured radar data and that the drift compensation takes place through a correction of time data of the measured radar data. Furthermore, the determination of the relative time position of the time references can include comparing received reference radar signals to a reference function within one of the radar systems, whereby the relative time position between the reference radar signals and the reference function is determined from a result and the relative time position of the time references is determined therefrom, taking into consideration a signal transit time of the reference radar signal. Moreover, the reference radar signals can include radar signals produced by the radar systems within a scope of a radar measurement. Additionally, the reference radar signals can be transmitted with a transmitter device of the radar systems used for radar measurement to at least one other radar system. Moreover, the reference radar signals can be transmitted with a separate transmitter device that is structurally separate from a transmitter device used for radar measurement, where the reference radar signals and radar signals used for radar measurement are produced by a common signal source. Additionally, a radar measurement system can utilize the radar measurement method noted above.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
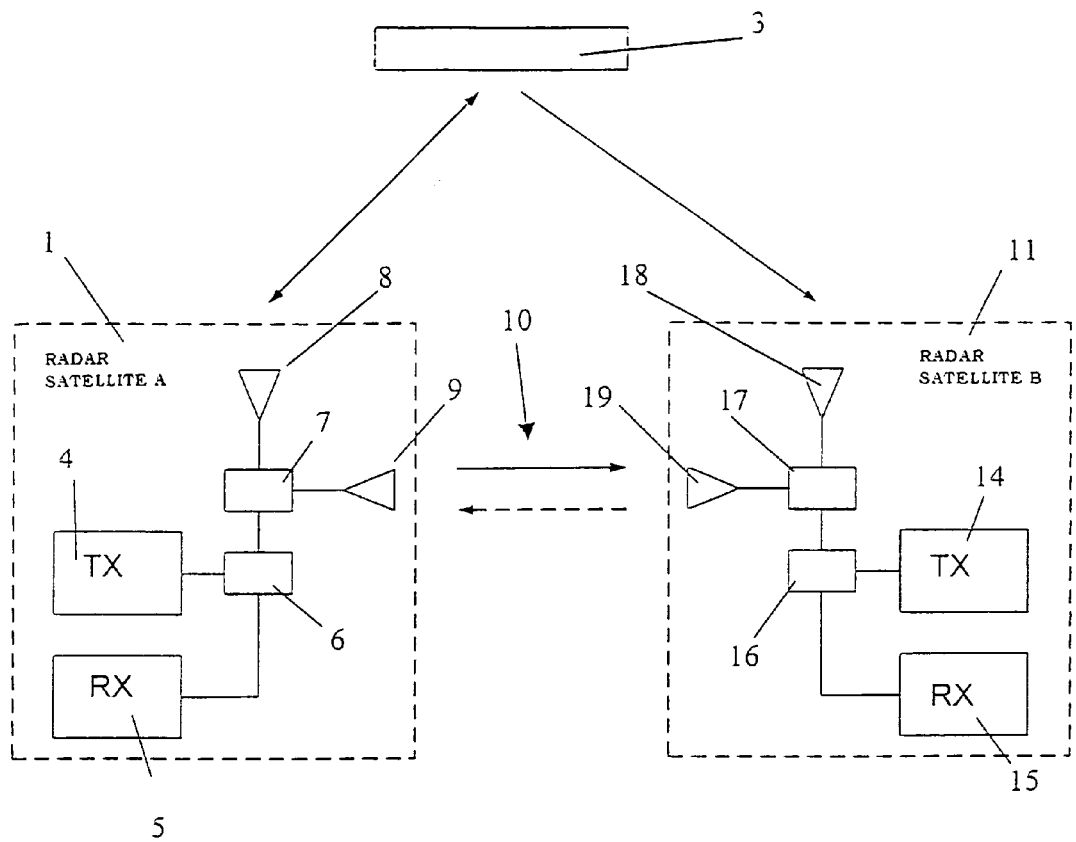
FIG. 1 shows an exchange of reference radar signals between two SAR satellites.

FIG. 1 shows a simplified block diagram of a method for transmitting a reference signal from a first SAR satellite 1 (radar satellite A) to a second (third, fourth . . . ) radar satellite 11 (radar satellite B). The satellites 1, 11 are to be used to measure a radar target 3 (radar target) such as, e.g., the earth's surface. Each of the satellites 1, 11 features a transmission device 4, 14 (TX) and a receiving device 5, 15 (RX). These are connected to a transmit/receive switch 6, 16 (RX/TX switch) and an antenna switch coupling device 7, 17 (antenna switch/coupler) that are used to feed the radar signal produced by the transmitter device 4, 14 to a radar measuring antenna 8, 18 (radar antenna) and a reference signal antenna 9, 19 (reference antenna) and to feed received signals in the reverse direction to the respective receiver device RX. In principle, each of the two satellites 1, 11 can be embodied to transmit and receive radar signals to or from the radar target 3. However, it can also be provided that only one of the satellites 1 transmits and receives radar measurement signals in the direction of the radar target 3, and another satellite 11 in contrast only receives radar measurement signals from the first satellite 1 that are reflected back from the radar target 3, as shown in FIG. 1.

A unidirectional or bi-directional exchange 10 of reference radar signals is now provided between the satellites 1, 11, where these radar signals come from the same signal source 4, 14 as the radar signals used for measurement. All the properties of the radar measurement signal of a radar satellite 1 are thus transmitted to at least one other satellite 11.

The exchange 10 of reference radar signals can take place directly and/or via a deviation, e.g., passively via the radar target 3 or actively via other satellites involved in a larger combination.

The antenna diagrams of the reference signal antennas 9, 19 can preferably be adjusted to the flight geometry, i.e., the relative position and movement of the satellites 1, 11 with respect to one another. To this end several reference signal antennas 9, 19 can also be provided, e.g., with different transmission properties and/or reception properties. The acquired data can be used "on board" or "on ground" for correcting the acquired radar data.

An interference with the reference data transmission by external signal sources or also by the radar antennas 8, 18 can be largely ruled out. To this end it can be provided in particular that the solid angle detected by the referenced signal antennas is greatly limited with suitable antenna configurations. Depending on the spatial arrangement of the satellites with respect to one another, a subordinate group of antennas of several can be used in order to reflect the reference signal from one satellite and to receive it from another.

The present invention makes it possible in particular to use ultra-stable reference oscillators (USO) with bistatic or multi-static radar instruments as time reference, the differential short-term stability (in the range of one to several pulse measurements) is sufficient for phase detection, the long-term drift of which, however, has to be compensated for in the evaluation of the radar measurements. The demands on the USOs alone need not therefore directly meet such high requirements as would actually be necessary for the measurement. One example, is a measurement with interferometric SAR (synthetic aperture radar) including at least two associated spatially separated SAR instruments.

The compensation takes place through the measurement of the phase relationship of the radar pulses with respect to one another. The drift of the time references with respect to one another can be determined from this phase relationship. This measured drift can be evaluated, e.g., in real time (on-line, i.e., on-board) and take place for the readjustment of one or more time references involved, or can be used only in the data evaluation (offline, i.e., on-ground) to compensate for measured drifts.

The phase of a transmitted radar signal is measured by comparing the radar signal to a local reference signal that is derived, e.g., from a local reference oscillator by frequency multiplication. Uncertainties in the time reference develop as phase variations proportionally to the carrier frequency used. The average frequency of the radar signal bandwidth used can be established as the local reference signal. The phases of the components of the signal with frequencies above and below the average frequency correspondingly change slightly more or less. Dispersive propagation changes this linear relationship. However, a separate phase detection with different frequency components permits inferences for the absolute phase velocities (e.g., due to the variable electron density in the ionosphere).

The phase detection is carried out in practice, e.g., through digital pulse compression of the recorded radar data. The phase of a local reference signal is already subtracted during the data acquisition by mixing in a baseband of the received radar signal. The pulse compression is carried out by the correlation of the measured signal with the (known) transmission signal. The position of the correlation maximum describes the rough time position between the start of the measurement and the arriving signal. In this example we define the center of the pulse ($t^{Tx}$: transmit, $t^{Rx}$: receive) as the time of the transmission pulse ($t^{Tx}$) or reception pulse ($t^{Rx}$). This corresponds to a correlation (impulse detection after compression) of a signal with a reference signal located symmetrically about the time 0.

The measured phase $\phi_{AB}$ of a radar pulse transmitted from A (satellite 1) to B (satellite 11) contains the sum of the phase lags from 1. $\phi_A$ of the phase of the transmitted pulse (known—assumed as 0) relative to the phase $\phi_{1RefA}$ of the local reference signal of the transmitter A
2. The (phase) lag through the signal transmission:
   $\phi_{components\ Tx\ A,\ Rx\ B}$ phase shifts in the associated assemblies:
   The intrinsic compensation of differential drifts is a part of this invention—the phase drifts of the assemblies involved in the measurement operation and in the signal transmission operation do not interfere as long as they are stable.
   $\phi_d = 2\pi \times$ propagation path/wavelength (in the propagation medium)
3. Differential phase between the local reference signal B $\phi_{1RefB}$ and the phase $\phi_{1RefA}$ of the local reference signal of the transmitter A. This differential phase corresponds to a (normally very small, e.g., smaller than 1 µs) shift of the two time references by $\Delta t$ (the time reference of satellite B is delayed by $\Delta t$ with respect to A).

$$\phi_{AB} = \phi_A - \phi_{components\ Tx\ A,\ Rx\ B} - \phi_d - \phi_{1RefA} - \phi_{1RefB}$$

For the transmission of a radar pulse from B to A the phase lags (without $\phi_{Tx}$ and $\phi_{components}$) are equal, only the algebraic sign of the differential phase of the local reference signals is inverted.

$$\phi_{BA} = \phi_B - \phi_{components\ Tx\ B,\ Rx\ A} - \phi_d - \phi_{1RefA} + \phi_{1RefB}$$

without $\phi_A$, $\phi_B$ and $\phi_{components}$ (permitted, as long as stable):

$$\phi_{1RefB} - \phi_{1RefA} = (\phi_{BA} - \phi_{AB})/2$$

With a unidirectional measurement the phase drift (2) can be determined by the signal transmission only with a known lag. Bidirectional measurements permit the compensation of the signal transmission effects by taking the difference of both measurements:

The lags (2) compensate for one another, the differential phase (3) of the local reference signals is doubled.

A time displacement of the measurements $\phi_{AB}$ (from A to B) and $\phi_{BA}$ (from B to A) is also possible as long as the behavior of the reference oscillators and the signal lags between these measurements is adequately known or can be interpolated ($t_{AB1} < t_{BA} < t_{AB2}$) or extrapolated (e.g., $t_{BA} < t_{AB1} < t_{AB2}$):

Time $t_{AB1}$: A->B, phase measurement $\phi_{AB1}$
Time $t_{BA}$: B->A, phase measurement $\phi_{BA}$
Time $t_{AB2}$: A->B, phase measurement $\phi_{AB2}$ $$\phi_{AB} := \phi_{AB1} + (\phi_{AB2} - \phi_{AB1})\ (t_{BA} - t_{AB1})/(t_{AB2} - t_{AB1})$$

The calculations have to take into consideration possible phase ambiguities. With small time intervals it is sufficient to reduce the differential phases such as ($\phi_{AB2} - \phi_{AB1}$) to ±180° in the calculations. With larger time intervals, changes of involved phases of over ±180° must be anticipated—the differential phases then have to be unrolled over ±180°. This can be realized by:

1. Closely following measurements of the phase so that changes between two adjacent phase measurements remain within ±180° and thus the ambiguities can be followed easily.
2. Interpolation and/or extrapolation of the phase shifts over time (measured with short time intervals at first and thus without ambiguity problems) in order to determine the phase shift by multiples of 360° over long time spans and to then refine the actual phase measurement (after such a longer time span) by a maximum of ±180°.
3. As in 2, but calculating the integral in 360° multiples from the modeling, e.g., from the quickly shifting $\phi_d$ from the path determination of the satellites concerned.

With slow shifts of the uncertainty of one of the contributions to the phase shift (e.g., non-linear time shift of the radar propagation length as part of the non-modellable fluctuation of $\phi_d$), it is sufficient to measure unidirectionally often enough in order to detect the rapid fluctuations (e.g., $\phi_{1\ RefB} - \phi_{1\ RefA}$) and to measure more seldom in the opposite direction in order to also detect the main part changing more slowly.

Several unidirectional or bi-directional measurements with SAR instruments can take place within one operational pulse. For example, the normal transmission pulse is transmitted from instrument B and received by instrument A unchanged in its time position. Instrument A transmits one or more pulses in a time-offset manner thereto (see prior extrapolation: $t_{BA} < t_{AB1} < t_{AB2}$) back to instrument B. All pulses are recorded and evaluated together with the radar data for compensation.

The times when the pulses have covered half the transit time $\tau/2$ during the transmission between A and B are used as time points. This transit time is often known for the above measurements with sufficient precision. With uncertain relative position $\Delta t$ of the two time references with respect to one another, these times can be determined on the basis of the measurements of one satellite with its time reference, e.g., satellite A:

$$t_{AB1} := {}^A_t{}^{Tx}_{AB1} + \tau/2 \text{ transmission time of pulse } AB1$$

$$t_{BA} := {}^A_t{}^{Rx}_{BA} - \tau/2 \text{ position of the received correlation maximum of pulse } BA$$

$$t_{AB2} := {}^A_t{}^{Tx}_{AB2} + \tau/2 \text{ transmission time of pulse } AB2.$$

Figure 2:
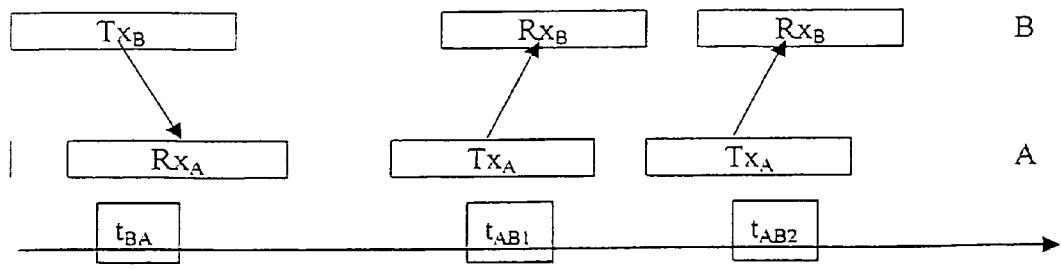
FIG. 2 shows a chronological course of a measurement cycle during the exchange of reference radar signals. The transmission intervals are thereby marked by "Tx" and the reception intervals by "Rx" in the lines assigned to the SAR satellites A or B.

An example of the time sequence of a measurement cycle during the exchange of signals is shown in FIG. 2.

An approximate synchronization of the signals to be transmitted is sufficient for measuring for an offline evaluation. The signals need only to be controlled such that the reciprocal measurements do not overlap due to the anticipated delays. A signal detection as with transponders is not necessary for purely offline evaluation, but it is helpful for a control in real time.

The precise displacement of the two time references by $\Delta t$ is determined analogously to the phase detection. The basis of the measurement is the precise determination of the time position of the received pulses, e.g., by correlation with a reference function matching the transmission signal and determination of the maximum value and/or median point of the correlation response.

According to the above example the receive time ${}^A_t{}^{Rx}_{BA}$ is measured on satellite A. The transmit times ${}^A_t{}^{Tx}_{AB1}$ and ${}^A_t{}^{Tx}_{AB2}$ are known. The following applies analogously for the times with respect to the time reference of satellite B: the receive times ${}^B_t{}^{Rx}_{AB1}$ and ${}^B_t{}^{Rx}_{AB2}$ are measured. The transmit time ${}^B_t{}^{Tx}_{BA}$ is known. A pulse exchange is sufficient to determine Δt. With a time offset of the measurements, the phase measurement can be extrapolated and/or interpolated analogously.

$$^B_t Rx_{AB1} = ^A_t Tx_{AB1} + \tau(t_{AB1}) - \Delta t$$

$$^A_t Rx_{BA} = ^B_t Tx_{BA} + \tau(t_{BA}) + \Delta t$$

$$\Delta t = [(^A_t Rx_{BA} - ^B_t Tx_{BA}) + (\tau(t_{AB1}) - \tau(t_{BA})) + (^A_t Tx_{AB1} - ^B_t Rx_{AB1})]/2$$

With higher relative velocities and/or accelerations it can be necessary to take into consideration relativistic effects with phases or time evaluations.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method of radar measurement by transmitting and receiving radar signals with at least two spatially separated radar systems, the method comprising:
   exchanging reference radar signals between the at least two radar systems to determine measurement-relevant parameters,
   wherein a determination of at least one of a relative phase relationship of the reference radar signals of the radar systems and a relative time position of time references of the radar systems is based on reference radar signals received.

2. The method according to claim 1, further comprising:
   ascertaining information on internal time references of the at least two radar systems based on the relative phase relationship of the reference radar signals.

3. The method according to claim 2, further comprising:
   determining a time-dependence of the relative phase relationship;
   determining a drift of at least one internal time reference; and
   compensating the drift on a basis of the drift of the time reference.

4. The method according to claim 3, wherein the drift of the at least one internal time reference is determined in real time and the drift compensation is made by readjusting a corresponding time reference.

5. The method according to claim 3, wherein the drift of a time reference is determined within a scope of an evaluation of measured radar data and that the drift compensation takes place through a correction of time data of the measured radar data.

6. The method according to claim 1, wherein the determination of the relative time position of the time references comprising comparing received reference radar signals to a reference function within one of the radar systems, whereby the relative time position between the reference radar signals and the reference function is determined from a result and the relative time position of the time references is determined therefrom, taking into consideration a signal transit time of the reference radar signal.

7. The method according to claim 1, wherein the reference radar signals comprise radar signals produced by the radar systems within a scope of a radar measurement.

8. The method according to claim 1, wherein the reference radar signals are transmitted with a transmitter device of the radar systems used for radar measurement to at least one other radar system.

9. The method according to claim 1, wherein the reference radar signals are transmitted with a separate transmitter device that is structurally separate from a transmitter device used for radar measurement, where the reference radar signals and radar signals used for radar measurement are produced by a common signal source.

10. A radar measurement system utilizing the radar measurement method according to claim 1.

11. A method of radar measurement utilizing at least two spatially separated radar systems, the method comprising:
    exchanging reference radar signals between the at least two radar systems; and
    determining at least one of a relative phase relationship of the reference radar signals of the radar systems and a relative time position of time references of the radar systems is based on the reference radar signals received.

12. The method according to claim 11, further comprising:
    ascertaining information on internal time references of the at least two radar systems based on the relative phase relationship of the reference radar signals.

13. The method according to claim 12, further comprising:
    determining a time-dependence of the relative phase relationship;
    determining a drift of at least one internal time reference; and
    compensating the drift on a basis of the drift of the time reference.

14. The method according to claim 13, wherein the drift of the at least one internal time reference is determined in real time and the drift compensation is made by readjusting a corresponding time reference.

15. The method according to claim 13, wherein the drift of a time reference is determined within a scope of an evaluation of measured radar data and that the drift compensation takes place through a correction of time data of the measured radar data.

16. The method according to claim 11, wherein the determination of the relative time position of the time references comprising comparing received reference radar signals to a reference function within one of the radar systems, whereby the relative time position between the reference radar signals and the reference function is determined from a result and the relative time position of the time references is determined therefrom, taking into consideration a signal transit time of the reference radar signal.

17. The method according to claim 11, wherein the reference radar signals comprise radar signals produced by the radar systems within a scope of a radar measurement.

18. The method according to claim 11, wherein the reference radar signals are transmitted with a transmitter device of the radar systems used for radar measurement to at least one other radar system.

19. The method according to claim 11, wherein the reference radar signals are transmitted with a separate transmitter device that is structurally separate from a transmitter device used for radar measurement, where the reference radar signals and radar signals used for radar measurement are produced by a common signal source.

20. A radar measurement system utilizing the radar measurement method according to claim 11.

* * * * *